(12) United States Patent
Ruehl

(10) Patent No.: US 6,907,137 B2
(45) Date of Patent: Jun. 14, 2005

(54) METHOD AND ARRANGEMENT FOR ADAPTING THE LATERAL AND TEMPORAL RESOLUTION OF A MICROSCOPE IMAGE

(75) Inventor: Helmut Ruehl, Giessen (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 713 days.

(21) Appl. No.: 09/888,936

(22) Filed: Jun. 25, 2001

(65) Prior Publication Data

US 2002/0015516 A1 Feb. 7, 2002

(30) Foreign Application Priority Data

Jun. 29, 2000 (DE) ........................................ 100 31 746

(51) Int. Cl.[7] .............................................. G08K 9/00
(52) U.S. Cl. ...................... 382/128; 128/922; 359/368; 378/43; 396/432; 725/41
(58) Field of Search ................................ 382/100, 128; 128/922; D16/131; 359/368; 378/43; 396/432, 439; 348/79, 211.12; 725/41

(56) References Cited

U.S. PATENT DOCUMENTS

| 4,242,703 | A | * | 12/1980 | Tsuboshima et al. | ........ 348/500 |
|---|---|---|---|---|---|
| 5,216,596 | A | | 6/1993 | Weinstein | .............. 364/413.02 |
| 5,302,829 | A | * | 4/1994 | Komatsu et al. | ............ 250/307 |
| 6,452,625 | B1 | * | 9/2002 | Kapitza | ........................ 348/80 |
| 6,650,703 | B1 | * | 11/2003 | Schwarzmann et al. | ...................... 375/240.01 |

FOREIGN PATENT DOCUMENTS

| DE | 19633997 C1 | 3/1998 |
|---|---|---|
| EP | 0994433 A1 | 4/2000 |
| WO | WO98/01999 | 1/1998 |
| WO | WO99/13360 | 3/1999 |

* cited by examiner

Primary Examiner—Samir Ahmed
Assistant Examiner—Anand Bhatnagar
(74) Attorney, Agent, or Firm—Simpson & Simpson, PLLC

(57) ABSTRACT

The method for adapting the lateral and temporal resolution of a microscope image allows the detection of temporal changes in the image content, and switches over to another transmission mode on the basis of the result of the determination.

The arrangement for adapting the lateral and temporal resolution of a microscope image comprises means for detecting the changes in the image content of a microscopic image. Also provided are electronic means for limiting the image content. Further means make it possible to switch over automatically to a suitable transmission mode. The means for detecting the change is an image data processing means (22) that ascertains salient image points and their positions within a defined image window. In addition, a comparison element (36) is provided and is connected to a switchover means (33). In the event of a deviation in the comparison element (36), the switchover means (33) thereupon reduces the image data of a current input image in accordance with the bandwidth and the transmission rate in order to generate a live image for video conferencing.

9 Claims, 2 Drawing Sheets

METHOD AND ARRANGEMENT FOR ADAPTING THE LATERAL AND TEMPORAL RESOLUTION OF A MICROSCOPE IMAGE

CROSS REFERENCE TO RELATED APPLICATIONS

This invention claims priority of a German patent application DE 100 31 746.4 filed Jun. 29, 2000 which is incorporated by reference herein.

FIELD OF THE INVENTION

The invention concerns a method for adapting the lateral and temporal resolution of a microscope image.

The method furthermore concerns an arrangement for adapting the lateral and temporal resolution of a microscope image.

BACKGROUND OF THE INVENTION

Optical-light image producers such as, for example, microscopes generate the image results in two dimensions and without a time delay. It is a conventional procedure that the sensed images are converted into electronic signals for the purpose of additional analog or digital processing. In this context, an additional limitation in lateral and/or temporal terms occurs because of the limited transmission bandwidth. This limitation occurs in particular in the context of long transmission pathways (telemicroscopy) or low-bandwidth transmission channels.

The user has, in this context, the opportunity to choose between high lateral resolution and a high image frequency.

U.S. Pat. No. 5,216,596 discloses a telepathology system. A workstation is set up at a remote location and receives images from a preparation (tissue) that is being examined with a microscope. The microscope images are recorded with a conventional video camera, and displayed at the remote location on a conventional video monitor. A digitization or coding of the image data is accomplished after imaging. The system presented here is tied to analog transmission links, and cannot achieve the necessary resolution in a conventional digital network.

The system exhibits no capability for reducing corresponding resolutions so as thereby to allow adaptation to the presently available bandwidth.

SUMMARY OF THE INVENTION

It is the object of the invention to create a method that performs the switchover between different operating modes (still-image or video conferencing) in user-friendly fashion.

This object is achieved by a method which is characterized by the following steps:
a) detecting changes in the currently transmitted image window by way of changes in the settings of the microscope;
b) switching over to a transmission mode for video conferencing;
c) recording the time that has elapsed since the last change in the settings of the microscope; and
d) switching over to the transmission mode for still images when a certain time limit is exceeded.

A further object of the invention is to create an arrangement that optimally utilizes and adapts the available bandwidth of the transmission channels without requiring user inputs for that purpose.

This object is achieved by an arrangement which is characterized in that
means for detecting the changes in the image content of a microscopic image;
electronic means for limiting the image content on the basis of the data supplied by the means for detecting the change in the image content; and
means for automatically switching over to the transmission mode suitable for the detected changes in the image content are provided.

An advantage of the invention is that after the build-up of an image that remains for a long period, no image refreshing is necessary. In this case the available bandwidth of the transmission channels can be fully utilized, and the image sensed by the microscope can be observed by a user at the remotely located station with the best resolution. If the user then wants to move to a different point in the preparation, he or she can also do this, for example, from the remote station. For that purpose, he or she can correspondingly adapt imaging parameters such as, for example, magnification, focus, and/or position of the X-Y stage. Another possibility is for the microscope parameters to be modified manually, and for corresponding means which detect that change to be provided at the microscope's location. In the case of an automatic microscope, the arrangement can ascertain those changes and then switch over automatically to a different transmission mode that is preferentially adapted to the bandwidth of the network used for transmission.

As soon as manipulations of the specimen (preparation) or the imaging system of the microscope are performed (for example, a change in the imaging scale or imaged area), the bandwidth necessary for a rapid image transmission rate at high resolution is not sufficient. To achieve higher image frequencies for this period of time, some of the lateral and/or chromatic resolution is simultaneously sacrificed for a short time. The arrangement is automatically switched over to a different transmission mode as a function of the input image (the image sensed by the microscope).

The transmission mode having the greatest possible lateral and chromatic specimen fidelity is referred to as "still-image" transmission. The mode with limited lateral and/or chromatic resolution is referred to as "video conferencing."

The switchover between still-image transmission and video conferencing takes place automatically on the basis of the detection of specimen movement or a change in instrument settings.

This detection takes place as follows:
In the case of motor-controlled movements, the movement is reported by the controlling system.
In the case of manual specimen displacement, a measurement system detects the change.
The electronic signals of the image are analyzed for any change in content.

If a change is identified by one of the aforesaid methods, the transmission system switches over to the "video conferencing" mode (rapid image frequency).

If the image content remains unchanged for a defined period of time, a switchover occurs to the "still-image" mode (high resolution). The defined period of time can be a specific time interval that can be installed in a timer.

BRIEF DESCRIPTION OF THE DRAWINGS

The subject matter of the invention is depicted in the drawings and will be described below with reference to the Figures, in which.

DETAILED DESCRIPTION OF THE INVENTION

Figure 1:
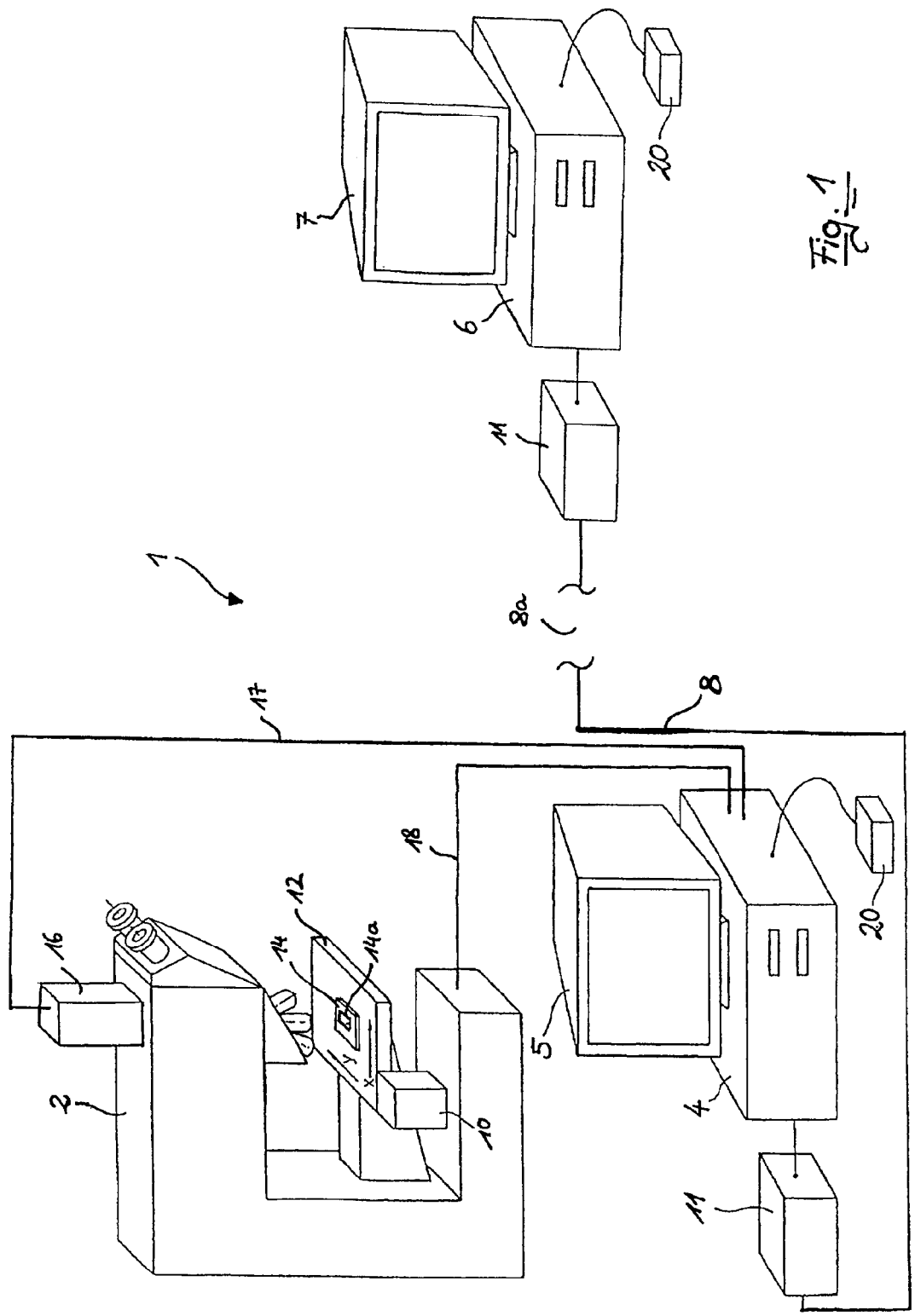
FIG. 1 schematically depicts a system in which the invention is used.

System 1 depicted in FIG. 1 comprises a microscope 2 that is set up at a location where preparations (tissue sections) for examination are being produced. The location is usually a histology or pathology department of a hospital. A first computer 4 having a monitor 5 is associated with microscope 2. A second computer 6, also having a monitor 7, is connected to first computer 4 via a conventional network 8. The network is represented in FIG. 1 by a connecting line having an interruption 8a, the better to illustrate that second computer 6 can in principle be installed at any desired distance from first computer 4.

In the exemplary embodiment depicted here, microscope 2 is configured as an automatic microscope. All the imaging parameters of microscope 2 can be set and modified, for example, from second computer 6. In this case microscope 2 possesses corresponding motors for setting the parameters. FIG. 1 depicts a motor 10 that makes possible displacement of an X-Y stage 12. Motors for changing the imaging scale, moving X-Y stage 12 in the Z direction, and/or focusing are not depicted for reasons of clarity. The arrangement and use of these motors is, however, evident to one skilled in the art.

A specimen slide 14, with a prepared preparation 14a on it, is placed on X-Y stage 12. Depending on the selected magnification, an image window (not depicted) is imaged and is recorded by a camera 16. Camera 16 can be configured as a conventional video camera or digital camera. Camera 16 is connected via a connection 17 to first computer 4. A further connection 18, over which control signals are sent to the corresponding motors, exists between first computer 4 and microscope 2. The control signals are conveyed via network 8 from second computer 6 to first computer 4. Image data are similarly conveyed via network 8 from first computer 4 to second computer 6. The two computers 4 and 6 can each be equipped with a modem 11 or another remote data transmission system that serves to establish a connection. An input unit 20 for user inputs is also connected to each computer 4 and 6. Input unit 20 can be configured as a mouse, keyboard, or voice control unit.

As already mentioned above, first computer 4 generally serves to sense the image data of microscope 2 and convert them into a corresponding data format for transfer via network 8. A compression of the image data can also be performed by first computer 4. In addition, microscope 2 is also equipped with position sensors (not depicted) which supply to first computer 4 signals that furnish information about the X, Y, and Z positions of X-Y stage 12. First computer 4 is also responsible for receiving data from second computer 6 to control microscope 2, and for converting them into corresponding control signals.

Figure 2:
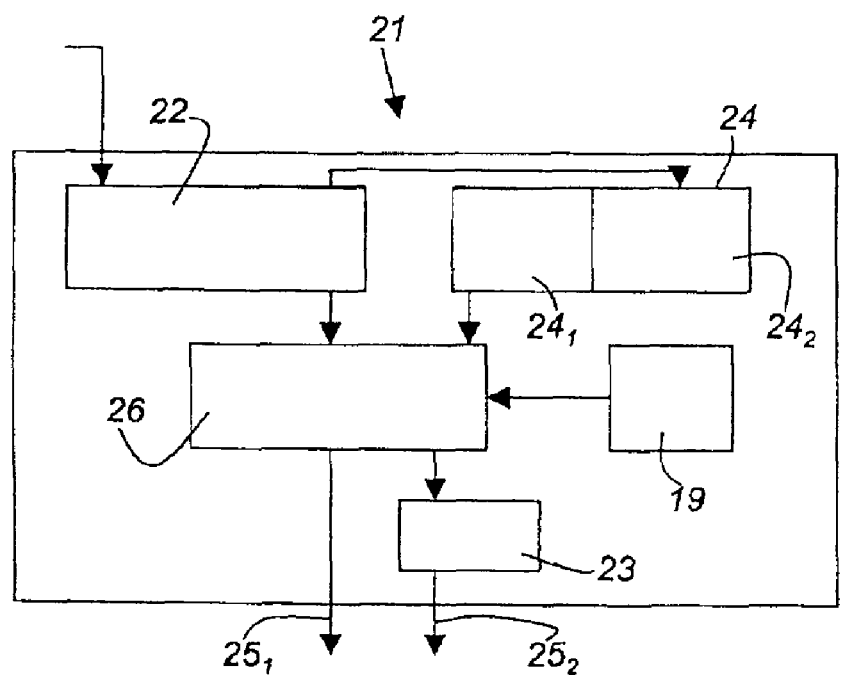
FIG. 2 schematically depicts the arrangement which makes possible switchover between the individual transmission modes in the context of a manual microscope.

FIG. 2 is a schematic depiction of an arrangement 21 that makes possible the switchover between the individual transmission modes in the context of a manual microscope. As already mentioned above, a purely manual microscope 2 ascertains changes in the microscope settings by way of the sensed image contents. Arrangement 21 comprises an image data processing means 22, a buffer memory 24, a comparison element 26, a timer 19, and a switchover means 23. Image data processing means 22 receives an input image from the camera. For that purpose, for example, salient image points and their positions within a defined image window (not depicted) are ascertained. These data are conveyed to buffer memory 24. Buffer memory 24 is subdivided into a first and second part $24_1$ and $24_2$. The data of a previous image are stored in first part $24_1$, and the data of the current image are stored in second part $24_2$. The data of the current and previous images are compared in comparison element 26, taking into account a time interval predefined by timer 19. If no deviations are identified in comparison element 26, a signal to continue transmitting a still image is sent via a first output $25_1$ of arrangement 20. In the event of a deviation, a signal is sent to the switchover means indicating that the image data of the input image are thereupon to be reduced in accordance with the bandwidth and the transmission rate, in order to generate a live image for video conferencing. The live image is output via a second output $25_2$ of arrangement 20.

Figure 3:
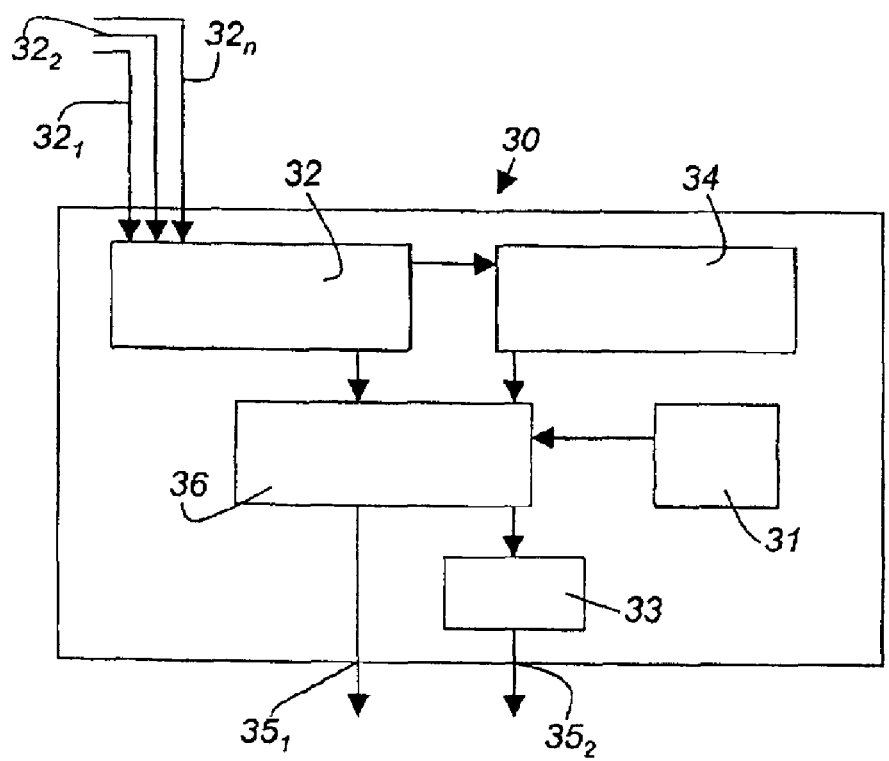
FIG. 3 schematically depicts the arrangement which makes possible switchover between the individual transmission modes in the context of an automatic microscope.

FIG. 3 is a schematic depiction of an arrangement 30 that makes possible the switchover between the individual transmission modes in the context of an automatic microscope 2. Arrangement 30 comprises a position data processing means 32, a buffer memory 34, a comparison element 36, a timer 31, and a switchover means 33. Position data processing means 32 possesses multiple inputs $32_1$, $32_2$, $32_n$ which supply signals regarding the position of X-Y stage 12, magnification, and focus. After processing, these data are representative of the position of an image window. These data are conveyed to buffer memory 34. The data of the current and previous image which are stored in buffer memory 34 are compared in comparison element 36, taking into account a time interval predefined by timer 31. If no deviations are identified in comparison element 36, a signal to continue transmitting a still image (or to indicate that no further transmission of a still image is necessary) is sent via a first output $35_1$ of arrangement 30. In the event of a deviation, a signal is sent to switchover means 33 indicating that the image data of the input image are thereupon to be reduced in accordance with the bandwidth and the transmission rate, in order to generate a live image for video conferencing. The live image is output via a second output $35_2$ of arrangement 30.

The invention has been described with reference to a particular embodiment. It is nevertheless self-evident that changes and modifications can be made without thereby leaving the range of protection of the claims recited hereinafter.

| PARTS LIST | |
| --- | --- |
| 2 | Microscope |
| 4 | First computer |
| 5 | Monitor |
| 6 | Second computer |
| 7 | Monitor |
| 8 | Network |
| 10 | Motor |
| 11 | Modem |
| 12 | X–Y stage |
| 14 | Specimen slide |
| 14a | Preparation |
| 16 | Camera |
| 17 | Connection |
| 18 | Connection |
| 19 | Input unit |
| 20 | Arrangement |

-continued

PARTS LIST

| | |
|---|---|
| 21 | Timer |
| 22 | Image data processing means |
| 23 | Switchover means |
| 24 | Buffer memory |
| $24_1$ | Buffer memory, first part |
| $24_2$ | Buffer memory, second part |
| $25_1$ | First output |
| $25_2$ | Second output |
| 30 | Arrangement |
| 31 | Timer |
| 32 | Position data processing means |
| $32_1, 32_2, 32_n$ | Multiple inputs |
| 33 | Switchover means |
| 34 | Buffer memory |
| $35_1$ | First output |
| $35_2$ | Second output |
| 36 | Comparison element |

What is claimed is:

1. A method for adapting the lateral and temporal resolution of a microscope image, characterized by the following steps:

a) detecting changes in the currently transmitted image window by way of changes in the settings of the microscope (2);

b) switching over to a transmission mode for video conferencing;

c) recording the time that has elapsed since the last change in the settings of the microscope (2); and d) switching over to the transmission mode for still images when a certain time limit is exceeded.

2. The method as defined in claim 1, characterized in that detection of the changes in the current image window is accomplished by means of an image analysis based on the comparison of two microscope images taken successively in time.

3. The method as defined in claim 1, characterized in that detection of the changes in the current image window is accomplished by means of an automatic comparison of the position of the image window of two microscope images taken successively in time.

4. The method as defined in claim 1, characterized in that in the context of an automatic microscope, the signals necessary for adjustment of the microscope parameters are detected, and on the basis of the signals a determination is made as to whether to switch over to other transmission mode.

5. The method as defined in claim 1, characterized in that in the context of an automatic microscope with manual adjustment capabilities, the changes in the image window are recorded as a function of time, and on the basis of the changes as a function of time a determination is made as to whether to switch over to another transmission mode.

6. The method as defined in claim 1 wherein the step of detecting changes is carried out by a image data processing means (22) that ascertains salient image points and their positions within a defined image window.

7. The method as defined in claim 6 wherein the step of detecting changes is carried out by a position data processing means (32) comprising multiple inputs ($32_1, 32_2, 32_n$) which supply signals regarding the position of an X-Y stage (12) and the magnification and focus of the microscope (2).

8. The method as defined in claim 1, wherein the step of recording time is carried out by a timer (21, 31) connected to a comparison element (26, 36) and the comparison element (26, 36) continues to supply a still image at a first output ($25_1, 35_1$) on the basis of a specific time interval of the timer (21, 31) and the result of the comparison.

9. The method as defined in claim 8, wherein the comparison element (26, 36) is connected to a switchover means (23, 33) and that, in the event of a deviation in the comparison element (26, 36), the switchover means (23, 33) thereupon reduces the image data of a current input image in accordance with the bandwidth and the transmission rate in order to generate a live image for video conferencing.

* * * * *

UNITED STATES PATENT AND TRADEMARK OFFICE
CERTIFICATE OF CORRECTION

PATENT NO. : 6,907,137 B2
DATED : June 14, 2005
INVENTOR(S) : Helmut Ruehl

It is certified that error appears in the above-identified patent and that said Letters Patent is hereby corrected as shown below:

Column 6,
Line 8, delete the word "other" and substitute the word -- another --.

Signed and Sealed this

Sixteenth Day of August, 2005

JON W. DUDAS
*Director of the United States Patent and Trademark Office*